US008503638B2

(12) United States Patent
Lemke et al.

(10) Patent No.: US 8,503,638 B2
(45) Date of Patent: Aug. 6, 2013

(54) METHOD AND APPARATUS FOR DISPLAYING A CUSTOMIZED CALLER LINE IDENTIFICATION

(75) Inventors: Mark R. Lemke, Mundelein, IL (US); Charles P. Binzel, Bristol, WI (US); Jerome Vogedes, Milwaukee, WI (US)

(73) Assignee: Motorola Mobility LLC, Libertyville, IL (US)

( * ) Notice: Subject to any disclaimer, the term of this patent is extended or adjusted under 35 U.S.C. 154(b) by 217 days.

(21) Appl. No.: 12/968,501

(22) Filed: Dec. 15, 2010

(65) Prior Publication Data

US 2012/0155626 A1 Jun. 21, 2012

(51) Int. Cl.
*H04M 1/56* (2006.01)

(52) U.S. Cl.
USPC ............ 379/142.03; 379/142.05; 379/142.06; 379/142.17; 455/415; 455/458

(58) Field of Classification Search
USPC ........................................ 379/142.04–142.06
See application file for complete search history.

(56) References Cited

U.S. PATENT DOCUMENTS

| | | | | |
|---|---|---|---|---|
| 5,274,699 | A | 12/1993 | Ranz | |
| 5,511,111 | A | 4/1996 | Serbetcioglu et al. | |
| 5,703,571 | A | 12/1997 | Cannon et al. | |
| 2003/0032413 | A1 | 2/2003 | Aksu et al. | |
| 2003/0032414 | A1 | 2/2003 | Melaku et al. | |
| 2003/0139172 | A1* | 7/2003 | Lampela et al. | 455/415 |
| 2007/0071198 | A1* | 3/2007 | Salomon | 379/142.01 |

FOREIGN PATENT DOCUMENTS

| | | | |
|---|---|---|---|
| EP | 1874017 | A1 | 1/2008 |
| WO | 2006069212 | A1 | 6/2006 |

OTHER PUBLICATIONS telespoof.com, "Spoof Caller ID with Telespoof.com", May 7, 2007, 1 page, http://www.telespoof.com/?gclid=CN _o6e24_. . . .
Patent Cooperation Treaty, "PCT Search Report and Written Opinion of the International Searching Authority" for International Application No. PCT/US2011/061328, Feb. 17, 2012, 12 pages.

* cited by examiner

*Primary Examiner* — Duc Nguyen
*Assistant Examiner* — Ibraham Sharifzada

(57) ABSTRACT

A method and apparatus for a customized CLI comprise receiving, by a network element, a first SET-UP message from a transmitting device during a call set up. The network element then retrieves an identification of the transmitting device from the first SET-UP message and obtains a first Caller Line Identification (CLI) of the transmitting device corresponding to the retrieved identification. Further, the network element determines whether the first SET-UP message includes a first indicator and retrieves a data message from the first SET-UP message when the first SET-UP message includes a first indicator. The network element then adds the data message, the first CLI, and a second indicator to a second SET-UP message and transmits the second SET-UP message to a receiving device during the same call set up, for displaying a customized CLI on the receiving device, thereby alerting a user of the receiving device of an incoming call.

14 Claims, 10 Drawing Sheets

1000

1010 1020

| BITS COMBINATIONS | | | | | | | | ASSOCIATED FUNCTIONALITY |
|---|---|---|---|---|---|---|---|---|
| 0 | 0 | 0 | 0 | 0 | 0 | 0 | 0 | USER SPECIFIC FUNCTIONALITY |
| 0 | 0 | 0 | 0 | 0 | 0 | 0 | 1 | OSI HIGH LAYER PROTOCOLS |
| 0 | 0 | 0 | 0 | 0 | 0 | 1 | 0 | X.244 |
| 0 | 0 | 0 | 0 | 0 | 0 | 1 | 1 | RESERVED FOR SYSTEM MANAGEMENT CONVERGENCE FUNCTION |
| 0 | 0 | 0 | 0 | 0 | 1 | 0 | 0 | IA5 CHARACTERS |
| 0 | 0 | 0 | 0 | 0 | 1 | 1 | 1 | REC.V.120 RATE ADAPTION |
| 0 | 0 | 0 | 0 | 1 | 0 | 0 | 0 | Q.931 (L.451) USER-NETWORK CALL CONTROL MESSAGES |
| | | | | | | | | |
| 0 | 0 | 0 | 0 | 1 | 1 | 0 | 0 | USER CLI |
| | | | | | | | | 1030 |
| 0 | 0 | 0 | 1 | 0 | 0 | 0 | 0 | RESERVED FOR OTHER NETWORK LAYER OR LAYER 3 PROTOCOLS |
| THROUGH | | | | | | | | |
| 0 | 0 | 1 | 1 | 1 | 1 | 1 | 1 | |
| | | | | | | | | |
| 0 | 1 | 0 | 0 | 0 | 0 | 0 | 0 | NATIONAL USE |
| THROUGH | | | | | | | | |
| 0 | 1 | 0 | 0 | 1 | 1 | 1 | 0 | |
| 0 | 1 | 0 | 0 | 1 | 1 | 1 | 1 | 3GPP CAPABILITY EXCHANGE PROTOCOL |
| | | | | | | | | |
| 0 | 1 | 0 | 1 | 0 | 0 | 0 | 0 | RESERVED FOR OTHER NETWORK LAYER OR LAYER 3 PROTOCOLS |
| THROUGH | | | | | | | | |
| 1 | 1 | 1 | 1 | 1 | 1 | 1 | 0 | |

USER USER PROTOCOL DISCRIMINATOR

930

700

800

1000

1010 1020

| BITS COMBINATIONS | | | | | | | | ASSOCIATED FUNCTIONALITY |
|---|---|---|---|---|---|---|---|---|
| 0 | 0 | 0 | 0 | 0 | 0 | 0 | 0 | USER SPECIFIC FUNCTIONALITY |
| 0 | 0 | 0 | 0 | 0 | 0 | 0 | 1 | OSI HIGH LAYER PROTOCOLS |
| 0 | 0 | 0 | 0 | 0 | 0 | 1 | 0 | X.244 |
| 0 | 0 | 0 | 0 | 0 | 0 | 1 | 1 | RESERVED FOR SYSTEM MANAGEMENT CONVERGENCE FUNCTION |
| 0 | 0 | 0 | 0 | 0 | 1 | 0 | 0 | IA5 CHARACTERS |
| 0 | 0 | 0 | 0 | 0 | 1 | 1 | 1 | REC.V.120 RATE ADAPTION |
| 0 | 0 | 0 | 0 | 1 | 0 | 0 | 0 | Q.931 (L.451) USER-NETWORK CALL CONTROL MESSAGES |
| | | | | | | | | |
| 0 | 0 | 0 | 0 | 1 | 1 | 0 | 0 | USER CLI |
| | | | | | | | | 1030 |
| 0 | 0 | 0 | 1 | 0 | 0 | 0 | 0 | RESERVED FOR OTHER NETWORK LAYER OR LAYER 3 PROTOCOLS |
| THROUGH | | | | | | | | |
| 0 | 0 | 1 | 1 | 1 | 1 | 1 | 1 | |
| | | | | | | | | |
| 0 | 1 | 0 | 0 | 0 | 0 | 0 | 0 | NATIONAL USE |
| THROUGH | | | | | | | | |
| 0 | 1 | 0 | 0 | 1 | 1 | 1 | 0 | |
| 0 | 1 | 0 | 0 | 1 | 1 | 1 | 1 | 3GPP CAPABILITY EXCHANGE PROTOCOL |
| | | | | | | | | |
| 0 | 1 | 0 | 1 | 0 | 0 | 0 | 0 | RESERVED FOR OTHER NETWORK LAYER OR LAYER 3 PROTOCOLS |
| THROUGH | | | | | | | | |
| 1 | 1 | 1 | 1 | 1 | 1 | 1 | 0 | |

USER USER PROTOCOL DISCRIMINATOR

METHOD AND APPARATUS FOR DISPLAYING A CUSTOMIZED CALLER LINE IDENTIFICATION

RELATED APPLICATIONS

This application is related to co-pending and commonly assigned U.S. application Ser. No. 12/968,498, filed Dec. 15, 2010.

FIELD OF THE DISCLOSURE

The present disclosure relates generally to communication systems where an identification of an originator of a call is transmitted to a recipient of the call for display during a call set up, and is more particularly directed towards a method for customizing the display of the identification of the call originator as desired by the call originator.

BACKGROUND

Most existing communication systems provision displaying an identification of a call originator to a call recipient. The feature is more popularly known as Caller Line Identification (CLI). In a typical CLI display, a telephone number of the call originator is displayed on a display of a communication device of a call recipient. Lately, the technological advancements have also enabled a display of a name or a picture associated with the call originator to the call recipient. However, the name or picture of the call recipient, i.e. the CLI, thus displayed is either pre-stored in a communication device of the call recipient or pre-stored at a network element that facilitates the call between the call originator and the call recipient. Therefore, the display of the CLI is either controlled by the network element or by the call recipient or by a combination of both. The call originator has, hitherto, been devoid of any control on how the CLI would be displayed to a call recipient.

However, in certain situations, it may be desired by an originator of a call, i.e., the calling party, to customize the way an identification of the calling party would be displayed to a call recipient, i.e., the called party. Accordingly, there is a need for a method and apparatus for displaying a customized CLI where the way the CLI is displayed to a called party is privileged for customization by the calling party.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 10 shows various combinations of bits possible in a user-user protocol discriminator of a user-user information element of a SET-UP message used in initiating a call set-up in accordance with some embodiments of the invention.

Figure 1:
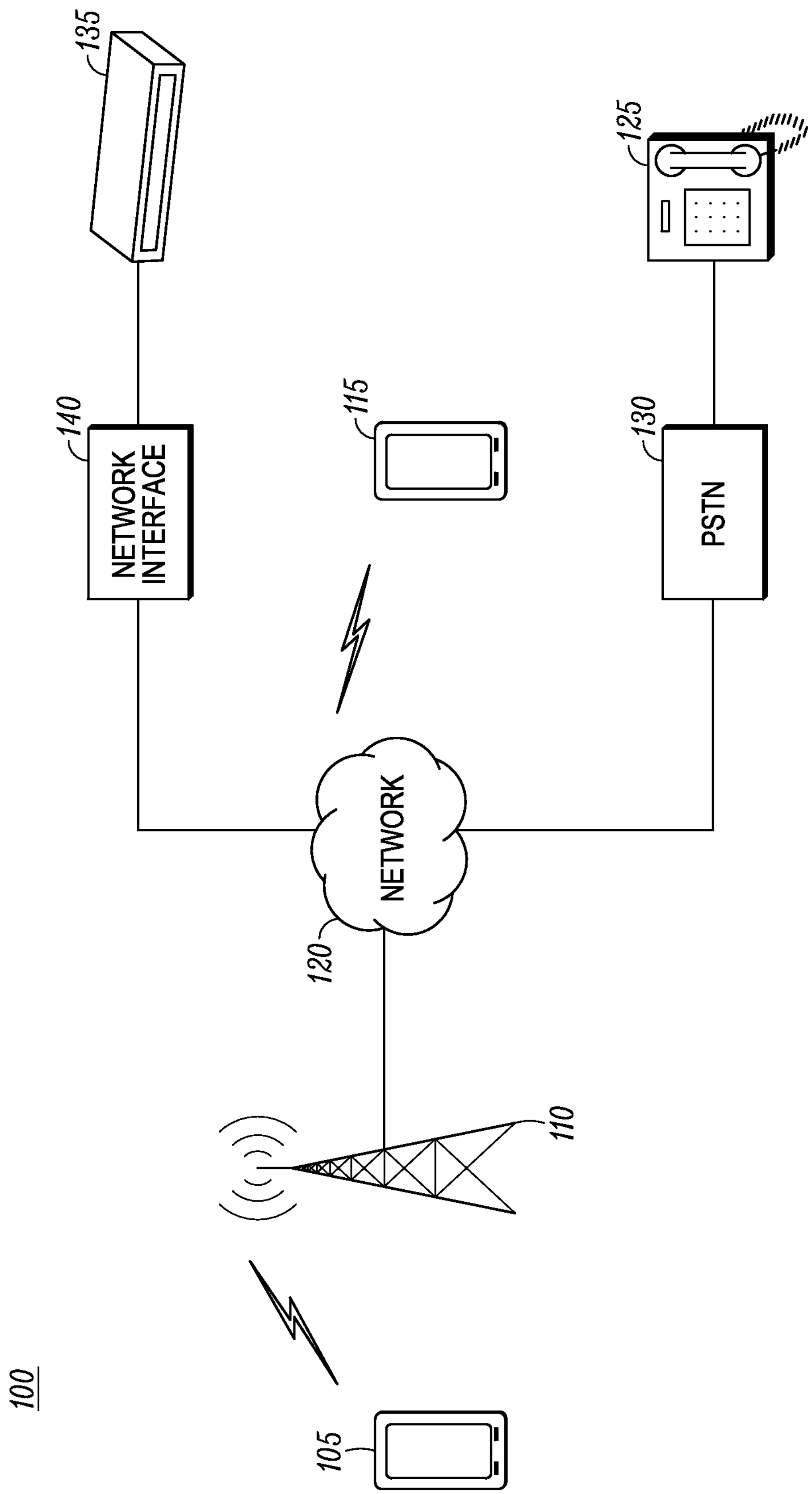
FIG. 1 is a network diagram of a communication system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the present invention described herein provide a method for providing a customized Caller Line Identification (CLI). The method includes receiving, by a network element, a first SET-UP message from a call originator, i.e., a transmitting device such as a mobile station, during a call set up. The first SET-UP message is sent from a mobile station to a network element of a network to initiate a mobile originating call establishment. The network element then retrieves a data message and an identification of the transmitting device from the first SET-UP message, when the first SET-UP message includes a first indicator. Further, the network element obtains a first Caller Line Identification (CLI) of the transmitting device corresponding to the retrieved identification. The network element then adds the data message, the first CLI, and a second indicator to a second SET-UP message and transmits the second SET-UP message to a call recipient, i.e., a receiving device such as another mobile station during the same call set up, for displaying the customized CLI on a display of the receiving device, thereby alerting a user of the receiving device of an incoming call from the transmitting device. Accordingly, the second SET-UP message is sent from the network element of the network to a mobile station to initiate a mobile terminated call establishment. The first SET-UP message and the second SET-UP message are used for setting up a call between two mobile stations and are more particularly used during a call initiation of the call set-up.

FIG. 1 is a perspective view of a communication system 100 in accordance with some embodiments of the invention. The communication system includes first communication device 105 and a second communication device 115, a base station 110, a first communication channel 145, a second communication channel 150, and a network 120. The network 120 is further coupled to a landline telephone 125 via a Public Switched Telephone Network (PSTN) 130. The network 120 is also coupled to a set top box 135 via a network interface 140. In another example, the network 120 may be coupled to a computing device such as a laptop (not shown) for communication over Voice over Internet Protocol (VoIP) or TCP/IP protocol.

The base station 110 may be a conventional base station transceiver or base station controller comprising conventional radio transceiver. The base station 110 typically consists of transmitters, receivers, and wireless routers coupled to a processor. Further, the network 120 routes the calls between the base station 110 and the second communication device 115. The network 120 of FIG. 1 may be any of a wired or a wireless network, or a combination thereof The network 120 may comprise various network infrastructure elements including one or more of MSCs (mobile switching centre), a router, a gateway etc. The base station 110 in conjunction with the network 120 is used for processing various requests including requests for call set up from various communication devices such as the first communication device 105 and the second communication device 115, in their respective areas of coverage.

Further, the first communication device 105 and the second communication device 115 may be wireless devices or wired devices or any other electronic devices. In the example of FIG. 1, the first communication device 105 is a wireless device, which may also be termed as a mobile station. In another example, the first communication device may be a set top box. In the example of FIG. 1, the second communication device 115 is a wireless communication device, i.e., a second mobile station. In another example, the second communication device 115 is a set top box 135. In yet another example, the second communication device is a landline communication device 125.

Further, the first communication device communicates with the base station 110 and the network 120 via the first communication channel 145. The first communication channel 145 may be any of a wired or a wireless communication channel. In one example, the first communication channel 145 is one of an RF (radio frequency) channel, a short range wireless channel, a dedicated physical channel and the like. Similarly, the second communication device 115 communicates with the network 120 via the second communication channel 150, which may be any of a wired or a wireless communication channel such as one of an RF (radio frequency) channel, a short range wireless channel, a dedicated physical channel and the like.

Figure 2:
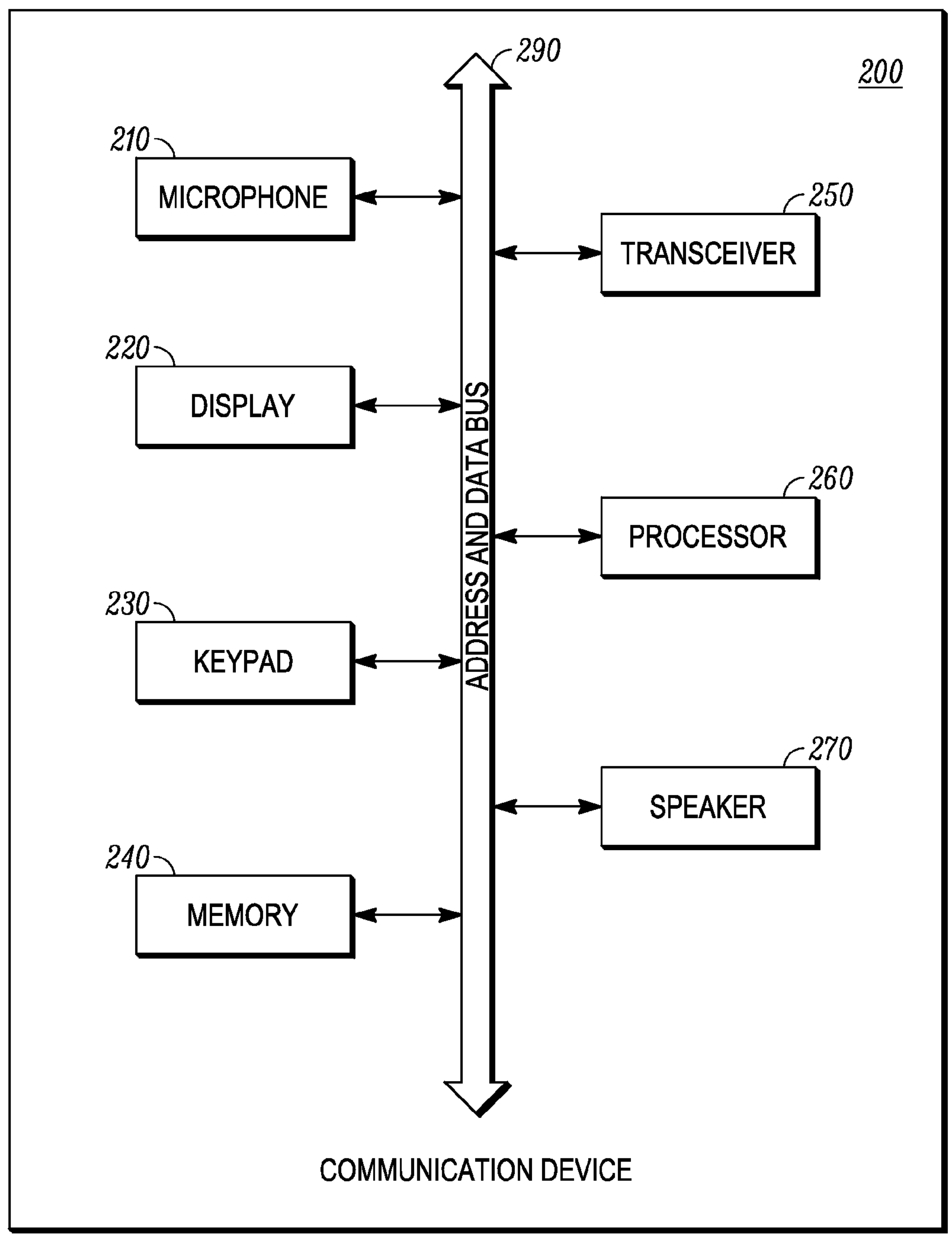
FIG. 2 is a block diagram of a communication device in accordance with some embodiments of the invention.

The first communication device 105 and the second communication device 115 are now described in more detail with respect to FIG. 2.

FIG. 2 is a block diagram of a communication device 200 in accordance with some embodiments of the present invention. The communication device 200 includes various components including a microphone 210, a display 220, a keypad 230, a memory 240, a transceiver 250, a processor 260, and a speaker 270. The various components are coupled to each other via an address and data bus 290.

The display 220 displays various visuals to a user of the communication device 200. The display 220 may also display a touch keypad (not shown) for use by the user of the communication device 200. The keypad 230 includes keys for accepting or declining an incoming call, a delete or cancel key, navigation keys, and alphanumeric keys etc. The speaker 270 converts incoming electrical signals into audio signals for reception by the users of the communication device 200. The display 220, the speaker 270, and the keypad 230 are also commonly called as user interfaces, as they allow the user of the communication device 200 to interface with the communication device 200. The user interface may additionally include components such as a microphone 210 used for inputting information into the communication device 200, and other external interfaces (not shown) which may be used to connect to a peripheral device.

FIG. 2 further shows a memory 240 which is used for storage of information. The memory 240 may be a volatile memory or/and a non-volatile memory. A volatile memory is used for storing temporary data that is erased every time the communication device 200 is powered off. A non-volatile memory is used for storing permanent type of data. Further, the processor 260 shown in FIG. 2 is the primary element that performs various operations of the communication device 200. The processor 260 is a conventional processor that processes the information that has to be transmitted or that has been received by the communication device 200 and further directs other elements within the communication device 200 to perform various operations.

The transceiver 250 shown in FIG. 2 is used for transmitting and receiving information, by the communication device 200. The transceiver 250 is used for transmitting information to or receiving information from various communication devices in the vicinity of the communication device 200. With reference to FIG. 1, the transceiver 250 may be associated with the first communication device 105 and may send and receive any requests for call set up from the base station 110, when the communication device 105 is present in the coverage area of base station 110.

The communication system 100 of FIG. 1 is now described in more detail with reference to FIGS. 3-8 in accordance with some embodiments of the present invention.

Figure 3:
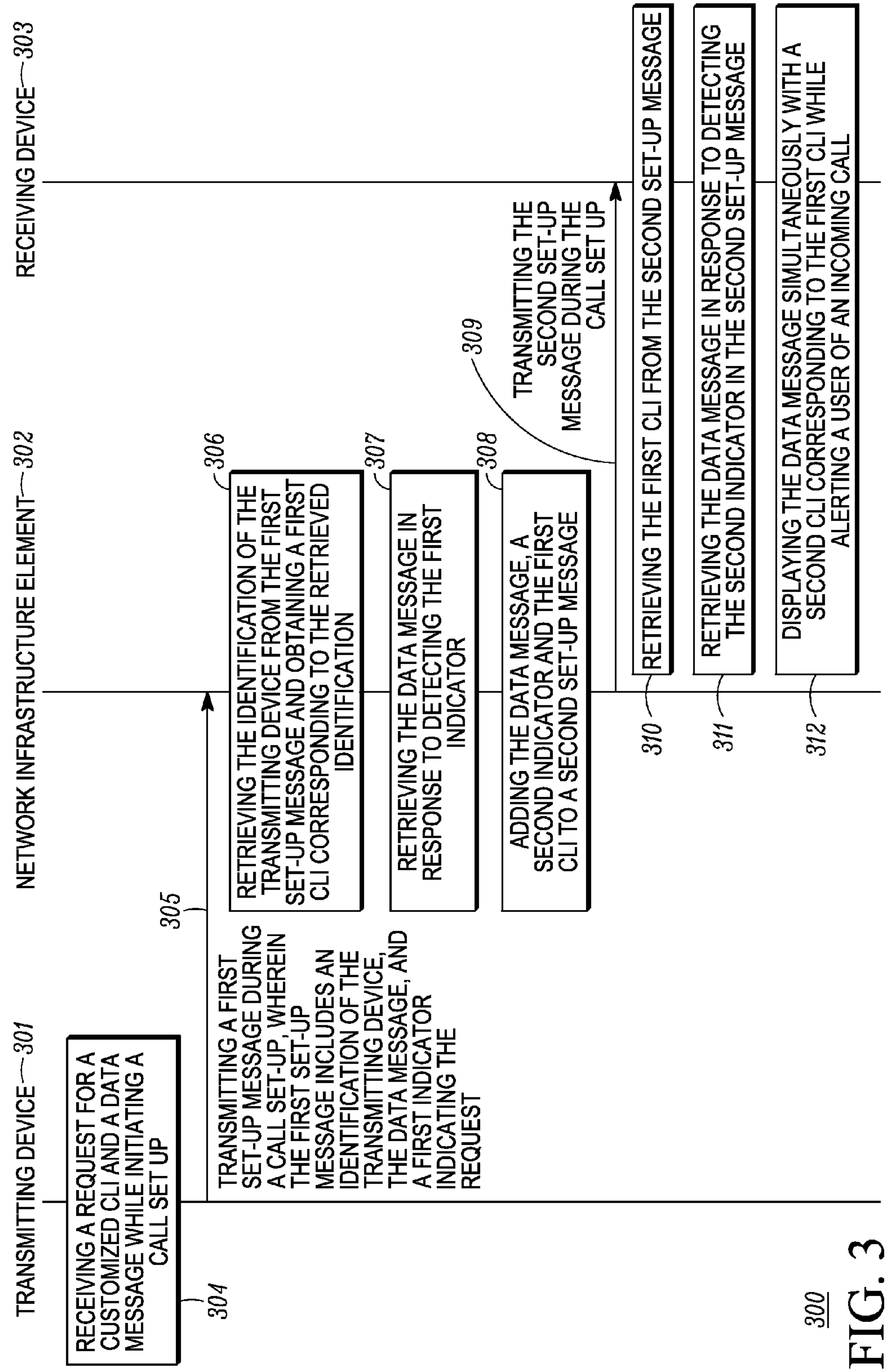
FIG. 3 is a signal flow diagram of a method for customizing Caller Line Identification (CLI) in accordance with some embodiments of the invention.

FIG. 3 shows a schematic signal flow diagram 300 in accordance with some embodiments of the invention. The signal flow 300 shown in FIG. 3 starts with a transmitting device 301 receiving a request 304 for a call set up from a user of the transmitting device 301. The transmitting device 301 may be any one of a wired or wireless communication device such as a communication device, a laptop, a PDA (personal digital assistant), a set-top box etc. In one example, the transmitting device is the wireless communication device 105 shown in FIG. 1 comprising the keypad 230, the transceiver 250 and the processor 260 (shown in FIG. 2). Further, receiving the request for call set up, via a user interface including the keypad 230 (shown in FIG. 2), includes receiving a request for a customized CLI and receiving a data message. The data message corresponds to any personalized message sent by a user of the transmitting device 301, which the user desires to be shown as customized CLI on a receiving device's display. However, in case of cellular communication, there may be a limit on the number of bytes that may be included as the data message.

Now, a processor 260 (shown in FIG. 2) corresponding to the transmitting device 301 forms a first SET-UP message. The first SET-UP message includes an identification of the transmitting device 301, an identification of the receiving device 303, the data message input by the user of the transmitting device 301, and an indicator indicating the user request for a customized CLI.

In particular, the first SET-UP message includes a user-user information element. In general, the user-user information element is used for conveying information between the transmitting device 301 and a remote receiving device 303. For one embodiment, the user-user information element may be a type 4 information element, as described in 3rd Generation Partnership Project; Technical Specification Group Core Network and Terminals; Mobile radio interface Layer 3 specification; Core network protocols; Stage 3 (Release 9). Further, the user-user information element may comprise a minimum length of 3 octets and a maximum length of 35 octets in a GSM (Global System for Mobile Communications) PLMN (Public Land Mobile Network).

Figure 9:
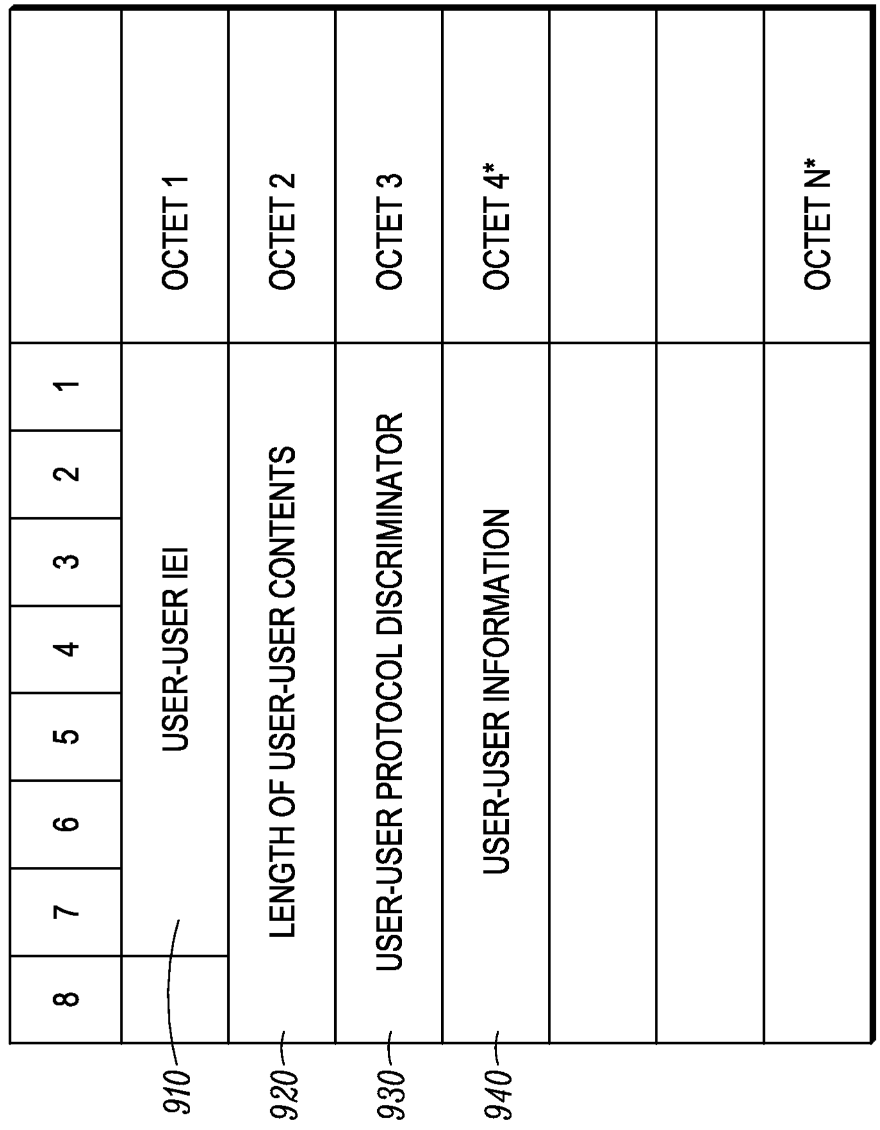
FIG. 9 shows a user-user information element of a SET-UP message used in initiating call set-up in accordance with some embodiments of the invention.

The user-user information element included in the first SET-UP message may further include various octets, where each octet is an 8-bit long field, as shown in FIG. 9. For example, in FIG. 9, the user-user information element 900 includes a first octet, a second octet, a third octet, and a fourth octet. Further, the first octet corresponds to a user-user information element identifier (user-user IEI) field 910, the second octet corresponds to a length of user-user information field 920, the third octet corresponds to a user-user protocol discriminator field 930, and the fourth octet corresponds to a user-user information field 940.

The user-user information element identifier 910 may be an identifier used for identifying the user-user information element 900. The user-user information field 940 may include the actual message input by the user, i.e., the data message input by the user of the transmitting device 301. Further, the length of user-user information field 920 may indicate a number of octets which include the actual data message, i.e., the number of user-user information fields 940. In this particular example, only one user-user information field 940 is being included. However, it should be understood by one of ordinary skill in the art that the number of user-user information fields 940 may be more than one depending upon the data message to be included in the user-user information fields. Further, the user-user protocol discriminator 930 may include various combinations of bits indicating various functionalities. For example, FIG. 10 shows the user-user protocol discriminator 930 and various possible bit values that are supported by the user-user protocol discriminator 930. FIG. 10 associates various bit combinations 1010 with functionalities 1020. For example, element 1030 in FIG. 10 represents one particular combination of bits "00001100" in the bit combinations 1010. This particular combination of bits "00001100" is the indicator for indicating the request for customized CLI. The user-user protocol discriminator 930 may also indicate a coding used for the user-user information. Further, it should be understood by one of ordinary skill in the art that the user-user information element 900 may have any number of octets limited only by maximum allowed length of the SET-UP message and reduced by the length of other elements in the SET-UP message.

Returning back to FIG. 3, after forming the first SET-UP message, the transmitting device 301 transmits 305, using the transceiver 250 (shown in FIG. 2) the first SET-UP message, during a call set up, to a network infrastructure element 302.

The network infrastructure element 302 may be any network element present in a communication environment that facilitates and controls end-to-end calls between communication devices. In one example, the network infrastructure element may be any one or more of a base station, a mobile switching centre, a router, a gateway etc. that controls and governs the establishment of calls between communication devices. In another example, the network infrastructure element is one or more of the base station 110 and the network 120 shown in FIG. 1. The network infrastructure element 302 further includes a processor and a transceiver including a transmitter and a receiver (not shown), hereon termed as a first processor, a first transmitter, and a first receiver.

The first transmitter at the network infrastructure element 302 receives the first SET-UP message transmitted by a transmitter corresponding to the transceiver 250 (shown in FIG. 2) of the transmitting device 301, hereon termed as a second transmitter at the transmitting device 301. The first SET-UP message is the same message that was formed by the processor 260 of the transmitting device 301, hereon termed as a second processor of the transmitting device 301. When the first SET-UP message is received by a first receiver at the network infrastructure element 302, the network infrastructure element 302 retrieves 306 the identification of the transmitting device 301 from the first SET-UP message. The first processor at the network infrastructure element 302 may additionally compare the retrieved identification of the transmitting device 301 to a database in a memory of the network infrastructure element 302 to determine if any information associated with the retrieved identification is stored in the memory. The database is pre-programmed into the memory of the network infrastructure element 302 by a network administrator of the network infrastructure element 302. The database may be periodically updated and maintained. The database may include a matrix correlating identifications of various communication devices and the information associated with these identifications. The information may be one or more of a name, a work place, an alternate email, an alias of the name or the like of the user of the communication device. In case, a match is found, i.e., the retrieved identification of the transmitting device maps to an entry in the database, the network infrastructure element 302 retrieves the information corresponding to the entry and selects this information as a first CLI of the transmitting device 301. In case, no match is found during the mapping, the network infrastructure element selects the identification of the transmitting device as retrieved from the first SET-UP message as the first CLI.

After the first processor at the network infrastructure element 302 determines a first CLI associated with the transmitting device 301, it determines 307 whether the first SET-UP message contains a unique indicator indicating the request for a customized CLI. In particular the network infrastructure element determines if a unique indicator, such as a unique combination of bits, is present in the user-user protocol discriminator field of the user-user information element included in the first SET-UP message, such as the user-user protocol discriminator 930 included in user-user information element 900 shown in FIG. 9. In case, the network infrastructure element 302 determines that there is no such indicator in the said user-user protocol discriminator of the first SET-UP message, the first processor at the network infrastructure element 302 forwards the first CLI of the transmitting device 301 to a receiving device 303 for alerting the receiving device 303 of an incoming call, as a conventional process.

However when the network infrastructure element 302 determines that the said user-user protocol discriminator of the user-user information element included in the first SET-UP message comprises the unique indicator, the first processor at the network infrastructure element 302 retrieves a data message contained in the first SET-UP message. In particular, the first processor retrieves the data message comprised in a user-user information field 940 (shown in FIG. 9) of the user-user information element 900 (shown in FIG. 9) of the first SET-UP message, in response to detecting the unique combination of bits in the user-user protocol discriminator 930 (shown in FIG. 9) of the user-user information element. The first processor at the network infrastructure element 302 then adds 308 the first CLI, the retrieved data message, and another indicator (second indicator) in a second SET-UP message for call set up. The second indicator is used to indicate a request for a customized CLI to the receiving device 303. In one example, the second indicator is a unique combination of bits in a particular field of the second SET-UP message for call set up. In another example, the second indicator is the same as the first indicator.

The second SET-UP message is similar to the first SET-UP message in terms of structure of the message. For example, the second SET-UP message includes the first CLI, an identification of the receiving device 303, the retrieved data message, and the second indicator indicating the user request for a customized CLI.

In particular, the second SET-UP message comprises a user-user information element. In general, the user-user information element is used for conveying information between the transmitting device 301 and the remote receiving device 303. For one embodiment, the user-user information element may be a type 4 information element, as described in 3rd Generation Partnership Project; Technical Specification Group Core Network and Terminals; Mobile radio interface Layer 3 specification; Core network protocols; Stage 3 (Release 9). Further, the user-user information element may comprise a minimum length of 3 octets and a maximum length of 35 octets in a GSM (Global System for Mobile Communications) PLMN (Public Land Mobile Network).

The user-user information element included in the second SET-UP message may further include various octets, where each octet is an 8-bit long field, as shown in FIG. 9. For example, in one particular case, the user-user information element 900 shown in FIG. 9 includes a first octet, a second octet, a third octet, and a fourth octet. Further, the first octet corresponds to a user-user information element identifier (user-user IEI) field 910, the second octet corresponds to a length of user-user information field 920, the third octet corresponds to a user-user protocol discriminator field 930, and the fourth octet corresponds to a user-user information field 940.

The user-user information element identifier 910 may be an identifier used for identifying the user-user information element 900. The user-user information field 940 may include the actual message input by the user, i.e., the retrieved message. Further, the length of user-user information field 920 may indicate a number of octets which include the retrieved message, i.e., the number of user-user information fields 940. In this particular example, only one user-user information field 940 is being included. However, it should be understood by one of ordinary skill in the art that the number of user-user information fields 940 may be more than one depending upon the data message to be included in the user-user information fields. Further, the user-user protocol discriminator 930 includes various combinations of bits indicating various functionalities. For example, FIG. 10 shows the user-user protocol discriminator 930 and various possible bit values that are supported by the user-user protocol discriminator 930. The possible bit values are combinations which have not been previously assigned. FIG. 10 associates various bit combinations 1010 with functionalities 1020. For example, element 1030 in FIG. 10 represents one particular combination of bits "00001100" in the bit combinations 1010. This particular combination of bits "00001100" is the indicator for indicating the request for customized CLI. The user-user protocol discriminator 930 may also indicate a coding used for the user-user information. Further, it should be understood by one of ordinary skill in the art that the user-user information element 900 may have any number of octets limited only by the maximum length of the second SET-UP message and further by the length of other elements of the second SET-UP message.

Returning back to FIG. 3, after forming the second SET-UP message, the network infrastructure element 302 now transmits 309 the second SET-UP message to a receiving device 303 via the first transmitter at the network infrastructure element 302. The receiving device 303 may be any communication device such as a laptop, a personal computer, a PDA, a set top box etc. In one example, the receiving device 303 is the wireless communication device 115 of FIG. 1.

The receiving device 303 now receives the second SET-UP message from the network infrastructure element 302 via a receiver corresponding to the transceiver 250 (shown in FIG. 2), herein termed as a second receiver, and retrieves the first CLI of the transmitting device 301 from the second SET-UP message. In one embodiment, after a processor 260 (shown in FIG. 2), of the receiving device 303, hereon a third processor, retrieves 310 the first CLI from the second SET-UP message, the third processor of the receiving device 303 may additionally map the retrieved first CLI to a look-up table, such as a phonebook, in a database of the receiving device 303. The look-up table comprises an association between CLIs of various communication devices and related information such as names of the owners of various communication devices, addresses of these owners, their places of work, email addresses, alternate telephone numbers etc. In case, while mapping the retrieved CLI of the transmitting device 301 to such a look-up table in the receiving device 303, a match is found, the third processor of the receiving device 303 may select one or more of a name of the owner, address of the owner, place of work etc. In this example, this selected information is the second CLI of the transmitting device 301.

However, when no match is found during the mapping, the second CLI is the same as the first CLI. In another case, any additional information thus found may only be appended to the first CLI to obtain the second CLI. In yet another case, the first CLI may supersede or overwrite any match thus found, and therefore, the second CLI is again the first CLI.

In an alternate embodiment, after retrieving the first CLI from the second SET-UP message, the third processor of the receiving device 303 may determine whether the retrieved first CLI is a telephone number of the transmitting device 301 or any other information associated with the transmitting device 301, as provided by the network infrastructure element 302. In case, it is determined that the retrieved CLI is a telephone number of the transmitting device 301, the receiving device 303 maps the retrieved CLI to the look-up table, as explained above. Otherwise, the receiving device 303 skips the step of mapping and selects the retrieved first CLI as the second CLI.

After determining a second CLI corresponding to the first CLI that was retrieved from the second SET-UP message for the call set up, the third processor of the receiving device 303 now determines a presence of a unique indicator in the second SET-UP message. In particular, the third processor determines the presence of the unique indicator by determining a unique combination of bits in a user-user protocol discriminator field (such as user-user protocol discriminator field 930 shown in FIG. 9) of a user-user information element (such as user-user information element 900 shown in FIG. 9) comprised in the second SET-UP message. In case, the receiving device 303 determines the presence of the unique indicator in the user-user protocol discriminator in the second SET-UP message, the third processor of the receiving device 303 retrieves 311 a data message comprised in the second SET-UP message. In particular, the third processor retrieves a data message comprised in the user-user information field (such as user-user information field 940 shown in FIG. 9) of the user-user information element (such as user-user information element 900 shown in FIG. 9) comprised in the second SET-UP message.

Further, in response to retrieving the data message comprised in the second SET-UP message, the third processor of the receiving device 303 directs a display, such as a display 220 (shown in FIG. 2), coupled to the third processor, to display the second CLI of the transmitting device 301 simultaneously with the data message, while alerting a user of the receiving device 303 of an incoming call from the transmitting device 301. Thus, the receiving device 303 displays a customized CLI on a display, such as the display 220 (shown in FIG. 2), of the receiving device 303.

It is to be understood by one of ordinary skill in the art that the functions of the first processor, the second processor, and the third processor may be performed by a single processor or component, or by two or more separate processors or components, without departing from the spirit and scope of the present invention. Similarly, the functions of the first transmitter, the second transmitter, the first receiver and/or the second receiver may be performed by a single element or component, or by two or more separate processors or components, without departing from the spirit and scope of the present invention. The invention is now described in more detail with respect to the functioning of each of the transmitting device 301, the network infrastructure element 302, and the receiving device 303, in FIGS. 4, 5, and 6 respectively.

Figure 4:
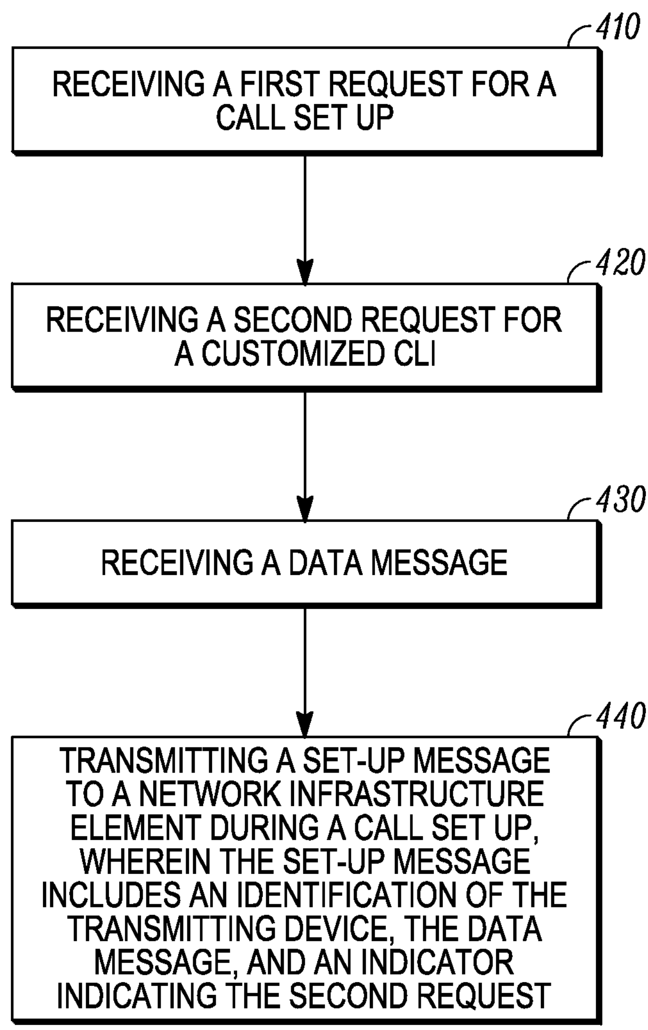
FIG. 4 is a flowchart of a method for displaying customized CLI, from the perspective of a calling party, in accordance with some embodiments of the invention.

FIG. 4 shows a flowchart, from a perspective of a transmitting device, in accordance with some embodiments of the invention. The transmitting device, also termed as a calling party, corresponds to the transmitting device 301 shown in FIG. 3 and the first communication device 105 shown in FIG. 1. The transmitting device is basically a communication device originating a request for a call set up. In one example, the transmitting device is any of a personal computer, a laptop, a PDA, a pager, a set top box, a landline telephone etc. The list is only exemplary and not limiting by any means.

The method 400 of FIG. 4 starts with a transmitting device receiving 410 a first request for a call set up from a user of the transmitting device via a user interface comprising a keypad 230 and/or a touchpad on a display 220, as shown in FIG. 2. The user may initiate the request by inputting an identification number of a receiving device and additionally pressing a dedicated key. In one example, the identification number is a telephone number of the receiving device. In another example, the user may initiate the request by selecting a recipient from a list of stored recipients in a phonebook stored in a memory of the transmitting device, such as memory 240 shown in FIG. 2. The phonebook is a database that stores information related to various users, their contact numbers, email addresses, work places, anniversaries, etc. The phonebook may be maintained and updated by the user of the transmitting device. In another example, the user may initiate the request by selecting a recipient from a repertory of dialed calls, missed calls, received calls, and the like. Such lists of dialed calls, missed calls, received calls etc. are automatically maintained by the transmitting device based on the communications carried out by the transmitting device. In yet another example, the user may initiate the request by selecting a recipient from various groups stored in the memory of the transmitting device. In one example, these groups may be friends, colleagues, family etc. A user may use his or her discretion to categorize the entries in the phonebook under any of the said groups. Later, the user may select a recipient by browsing through one of these groups.

In one embodiment, after the user has selected a recipient for call initiation, the user may press a dedicated key on the keypad (such as the keypad 230 shown in FIG. 2) to request a customized CLI for the call. In this embodiment, a determination that the dedicated key has been pressed is considered as a second request for a customized CLI by the transmitting device that detects the dedicated key press or dedicated key actuation.

In another embodiment, after the user has selected a recipient for call initiation, the transmitting device may now prompt the user to confirm whether the user desires to transmit a customized CLI. In this example, the transmitting device displays a pop-up on a display, such as display 220 shown in FIG. 2, of the transmitting device, asking the user to input an affirmative or negative response, on whether a customized CLI is to be transmitted. In case, the user inputs a negative response, the transmitting device transmits the identification of the transmitting device and an identification of a receiving device to a network element (such as a network infrastructure element 302 shown in FIG. 3) for a conventional call set up. However, in case, the user inputs an affirmative response, it is considered as receiving 420 a second request for a customized CLI.

After receiving the second request for the customized CLI, the transmitting device displays another pop-up on the display of the transmitting device, asking a user to input his or her message for the customized CLI, which is regarded as receiving a data message by the transmitting device. The user may input 430 any personalized message taking into considering a character or word limit, if any.

In another example, when the user inputs an affirmative response to the query on whether the user desires a customized CLI, the transmitting device may display a list of pre-stored signatures associated with the selected recipient. These pre-stored signatures may be fed into the memory of the transmitting device by a user or a manufacturer of the transmitting device. In one example, a user creates a database that links various phonebook entries to various signatures. Later, the transmitting device maps a recipient selected by a user, from a phonebook, to the database, to retrieve an associated list of signatures.

In another example, a user may create a database in the memory that associates various groups stored in the transmitting device to a number of signatures. In this case, each group is linked to a particular list of signatures. For example, the user may associate one list of signatures with a group "friends" and another list of signatures with a group "family." When the transmitting device detects that a recipient has been selected by a user, the transmitting device compares the selected recipient with each entry in the plurality of groups to determine a group to which the recipient belongs. Once the transmitting device has determined a group to which a selected recipient belongs, the transmitting device displays an associated list of signatures related to the determined group, in response to determining that a user has inputted a request for a customized CLI.

In yet another example, the user may create a database that links various automatic logs of calls to a respective plurality of signatures. In this case, each log of call is associated with a respective list of signatures. For example, the log of "missed calls" is associated with a first list of signatures comprising "free now", "busy later", "apologies", "meeting" whereas a log of "received calls" is associated with a second list of signatures comprising "missing you", "emergency", "call me". In this example, as soon as the user inputs a request for a customized CLI, the transmitting device compares a selected call recipient with the entries in the logs of call, and determines a log based on the most recent entry in time. The transmitting device then displays a list of signatures associated with the determined log.

When the transmitting device displays the lists of signatures, as above, a user may select a desired signature from the displayed list. The selected signature is regarded as receiving a data message by the transmitting device. In one example, the transmitting device additionally prompts the user to update the selected signature. The user may select to update the selected signature, or send the selected signature as such without any changes. In another case, the user may update the selected signature and store the updated signature either by replacing the original selected signature or as a new entry in the associated signature list. In this case, the updated signature is regarded as receiving a data message by the transmitting device.

After a user has either manually entered the data message either by entering a personalized message and/or selecting a signature from a list of displayed signatures, the transmitting device transmits 440 a SET-UP message to a network element for call set up. In one example, this SET-UP message is transmitted via a transceiver 250 shown in FIG. 2. This SET-UP message comprises an identification of the transmitting device, an identification of the receiving device, a data message comprising the personalized message entered by the user or/and a signature selected by the user, and an indicator indicating a request for the customized CLI during the call set up.

The SET-UP message further comprises a user-user information element 900 as shown in FIG. 9. In general, the user-user information element 900 is used for conveying information between the transmitting device and a remote receiving device. For one embodiment, the user-user information element 900 may be a type 4 information element, as described in 3rd Generation Partnership Project; Technical Specification Group Core Network and Terminals; Mobile radio interface Layer 3 specification; Core network protocols; Stage 3 (Release 9). Further, the user-user information element 900 may comprise a minimum length of 3 octets and a maximum length of 35 octets in a GSM (Global System for Mobile Communications) PLMN (Public Land Mobile Network).

The user-user information element 900 included in the first SET-UP message may further include various octets, where each octet is an 8-bit long field, as shown in FIG. 9. For example, in one particular case, the user-user information element includes a first octet, a second octet, a third octet, and a fourth octet. Further, the first octet may correspond to a user-user information element identifier (user-user IEI) field 910, the second octet corresponds to a length of user-user information field 920, the third octet corresponds to a user-user protocol discriminator field 930, and the fourth octet corresponds to a user-user information field 940.

The user-user information element identifier 910 may be an identifier used for identifying the user-user information element 900. The user-user information field 940 may include the actual message input by the user, i.e., the data message input by the user of the transmitting device 301. Further, the length of user-user information field 920 may indicate a number of octets which include the actual data message, i.e., the number of user-user information fields 940. In this particular example, only one user-user information field 940 is being included. However, it should be understood by one of ordinary skill in the art that the number of user-user information fields 940 may be more than one depending upon the data message to be included in the user-user information fields. Further, the user-user protocol discriminator 930 includes various combinations of bits indicating various functionalities. For example, FIG. 10 shows the user-user protocol discriminator 930 and various possible bit values that are supported by the user-user protocol discriminator 930. FIG. 10 associates various bit combinations 1010 with functionalities 1020. The possible bit combinations are values which have not been previously assigned or used. In this particular example, the combination of bits "00001100" in the bit combinations 1010 of user-user protocol discriminator 930 is being used to indicate a User CLI, as shown in element 1030 of FIG. 10. This particular combination of bits "00001100" is the indicator for indicating the request for customized CLI. The SET-UP message comprising the user-user information element 900 is transmitted to the network element. The user-user protocol discriminator 930 may also indicate a coding used for the user-user information.

Figure 5:
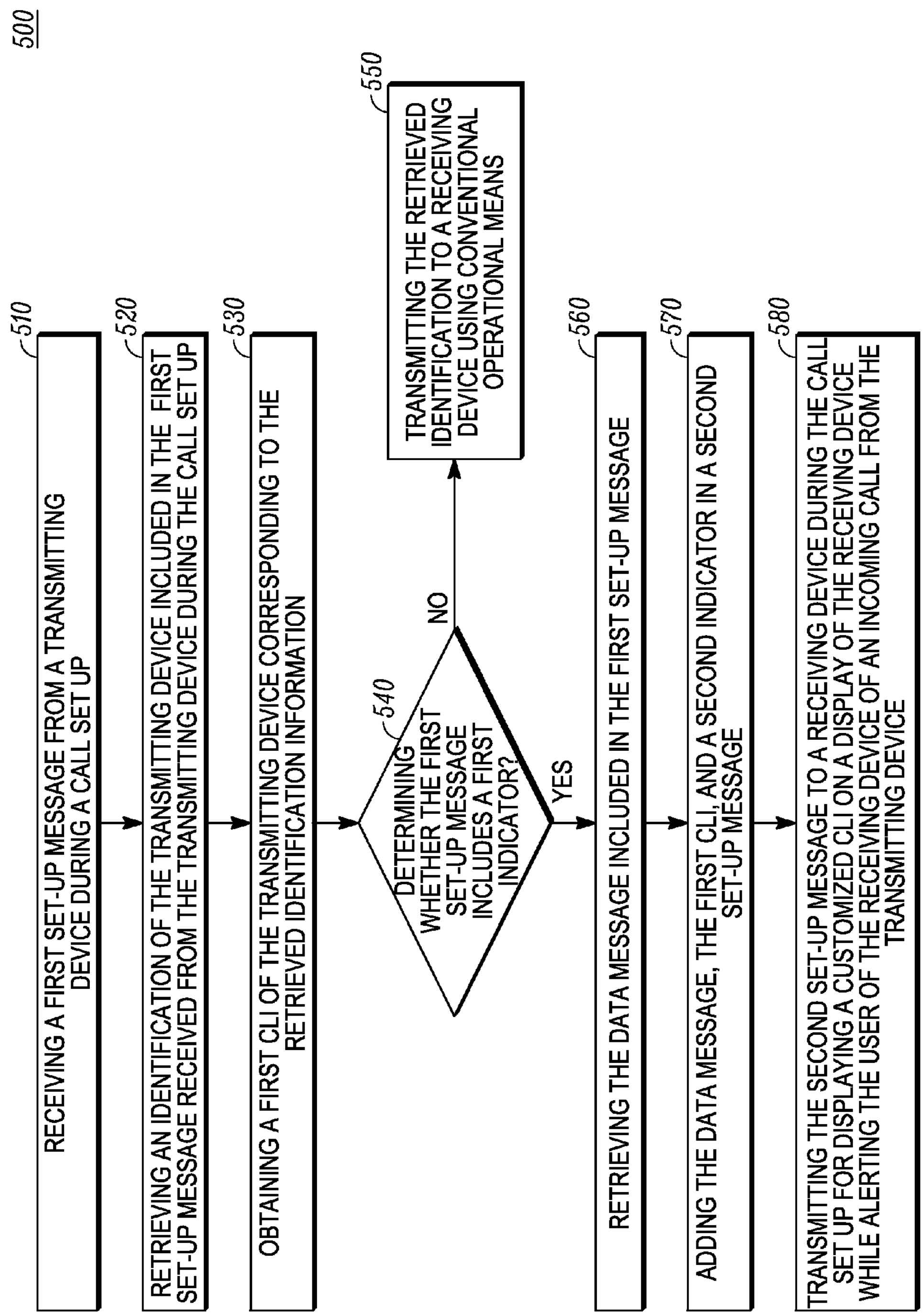
FIG. 5 is a flowchart of a method for displaying a customized CLI, from the perspective of a network element, in accordance with some embodiments of the invention.

FIG. 5 shows a flowchart, from a perspective of a network element, in accordance with some embodiments of the invention. The network element may be any element in the network of a communication system that facilitates and controls the establishment of end to end calls between the communication devices. In one example, the network element may be any one of a base station controller, a mobile switching center, a router, a gateway etc. In another example, the network element is the base station 110, as shown in FIG. 1.

The method 500 starts when the network element receives 510 a first SET-UP message from a transmitting device, such as the first communication device 105 shown in FIG. 1, requesting a call set up. The first SET-UP message received by the network comprises an identification of a transmitting device, an identification of a receiving device, an indicator indicating a request for customized CLI, and a data message. The first SET-UP message is similar to the SET-UP message transmitted by the transmitting device, as explained above with respect to FIG. 4. The network element retrieves 520 the identification of the transmitting device included in the first SET-UP message on receiving the first SET-UP message. Further, the network element determines 530 a first CLI corresponding to the retrieved identification of the transmitting device. In one example, the first CLI is determined based on comparing the retrieved identification with a look-up table stored in a memory of the transmitting device. The look-up table comprises various entries that contain an association between the identifications of various communication devices and other related information such as names of the owners of the communication devices, alternate contact numbers, email addresses associated with these owners etc. The network element compares the retrieved identification of the transmitting device with the various entries in the look-up table to find a match. In one example, when an entry match is found, the network element may select the first CLI to be a name of an owner corresponding to the match. In another example, when a match is found, the network element may select a name of the organization of the owner of the communication device that is found to be associated with the retrieved identification. In yet another example, when no match is found, the network element may select the retrieved identification as the first CLI.

After the network element has determined the first CLI of the transmitting device corresponding to the retrieved identification information, the network element determines 540 whether the first SET-UP message includes a first indicator. In one example, the network element checks a particular field such as the user-user protocol discriminator field 930 in the user-user information element 900 (shown in FIG. 9) in the first SET-UP message for the presence of a unique combination of bits. In case, it is determined that the first indicator is not present in the first SET-UP message, the network element may perform conventional operations on the first CLI, such as transmitting 550 the first CLI to a receiving device, where the address of the receiving device is determined by the network element from the first SET-UP message.

In case it is determined that the particular field such as the user-user protocol discriminator 930 of the user-user information element 900 comprised in the first SET-UP message comprises the first indicator, the network element retrieves 560 a data message comprised in the first SET-UP message. The data message is a personalized message or a default signature sent from the transmitting party to be displayed with the first CLI, as a customized CLI, to the receiving party. The network element retrieves the data message from a user-user information field 940 of the user-user information element 900 (as shown in FIG. 9) of the first SET-UP message.

After the network element has retrieved the data message from the first SET-UP message, the network element now generates a second SET-UP message to be transmitted to the receiving party during call set up for establishing the call. For generating the said second SET-UP message, the network element adds 570 the first CLI, the retrieved data message, and a unique indicator to a new message, which forms the second SET-UP message.

The second SET-UP message initiates a mobile terminated call establishment. The second SET-UP message comprises a user-user information element 900 as shown in FIG. 9. The user-user information element is now described with respect to FIG. 9. The user-user information element 900 is used for conveying information between the transmitting party and the receiving party. For one embodiment, the user-user information element 900 may be a type 4 information element, as described in 3rd Generation Partnership Project; Technical Specification Group Core Network and Terminals; Mobile radio interface Layer 3 specification; Core network protocols; Stage 3 (Release 9). Further, the user-user information element 900 may be minimum 3 octets in length and maximum 35 octets in length, in a GSM (Global System for Mobile Communications) PLMN (Public Land Mobile Network).

Further, the user-user information element 900 included in the second SET-UP message may include various octets, where each octet is an 8-bit long field, as shown in FIG. 9. For example, in one particular case, the user-user information element includes a first octet, a second octet, a third octet, and a fourth octet. Further, the first octet corresponds to a user-user information element identifier (user-user IEI) field 910, the second octet corresponds to a length of user-user information field 920, the third octet corresponds to a user-user protocol discriminator field 930, and the fourth octet corresponds to a user-user information field 940.

The user-user information element identifier 910 may be an identifier used for identifying the user-user information element 900. The user-user information field 940 may include the actual message input by the user, i.e., the retrieved message. Further, the length of user-user information field 920 may indicate a number of octets which include the retrieved message, i.e., the number of user-user information fields 940. In this particular example, only one user-user information field 940 is being included. However, it should be understood by one of ordinary skill in the art that the number of user-user information fields 940 may be more than one depending upon the retrieved message.

Further, the user-user protocol discriminator 930 includes various combinations of bits indicating various functionalities. For example, FIG. 10 shows the user-user protocol discriminator 930 and various possible bit values that are supported by the user-user protocol discriminator 930. The possible bit values are combinations which have not been previously assigned. FIG. 10 associates various bit combinations 1010 with functionalities 1020. In this particular example, the combination of bits "00001100" in the bit combinations 1010 of user-user protocol discriminator 930 is being used to indicate a User CLI, as shown in element 1030 of FIG. 10. This particular combination of bits "00001100" is the indicator for indicating the request for customized CLI. In another example, the unique indicator for indicating the request for customized CLI may be any specific combination of bits in any particular field of the second SET-UP message. In yet another example, the unique indicator for indicating the request for customized CLI may be any previously un-assigned combinations of bits. In yet another example, the unique indicator included in the second SET-UP message is the same as the unique indicator determined in the first SET-UP message by the network element.

After generating the second SET-UP message, the network element transmits 580 the second SET-UP message to the receiving device during the call set up for establishing the call between the transmitting device and the receiving device. The network elements transmits the second SET-UP message such that when the receiving device receives the second SET-UP message, it displays a customized CLI comprising the data message on a display of the receiving device, while alerting a user of the receiving device of an incoming call.

Figure 6:
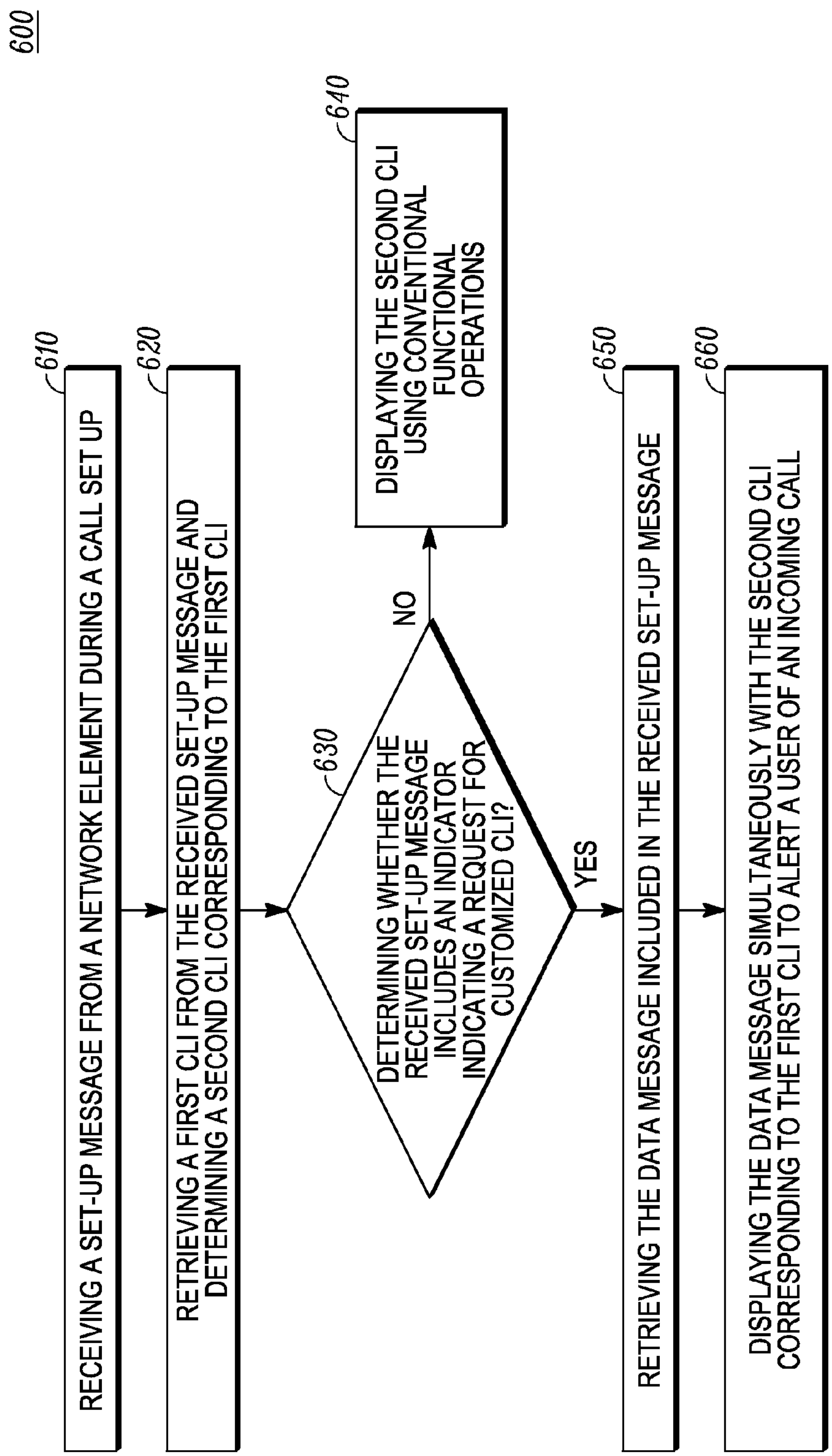
FIG. 6 is a flowchart of a method of displaying a customized CLI, from the perspective of a called party, in accordance with some embodiments of the invention.

FIG. 6 shows a flowchart, from a perspective of a receiving device in accordance with some embodiments of the invention. The receiving device, also termed as a called party, corresponds to the receiving device 303 shown in FIG. 3 and the communication device 115 shown in FIG. 1. In one example, the receiving device is any of a personal computer, a laptop, a PDA (personal digital assistant), a pager, a set top box, a landline telephone etc. The list is only exemplary and not limiting by any means.

The method 600 starts at the receiving device when the receiving device receives 610 a SET-UP message from a network element for a call-set up, say via a transceiver 250, as shown in FIG. 2. The SET-UP message received at the receiving device comprises a first CLI of the transmitting device, an identification of the receiving device, an indicator indicating a request for customized CLI, and a data message. The SET-UP message, thus received, corresponds to the second SET-UP message transmitted by the network element described in FIG. 5. A processor of the receiving device, such as the processor 260 shown in FIG. 2, retrieves 620 a first CLI from the SET-UP message upon the receipt of the SET-UP message from the network element. The first CLI may either be a telephone number of a transmitting device that originated the call or any one of a name or work organization or any other identification of a user of the transmitting device that originated the call, as mapped by the network element described in FIG. 5.

After receiving the first CLI, the receiving device may choose to map the first CLI to its own database in a memory, such as a memory 240 shown in FIG. 2, to determine a second CLI. The database may be maintained and updated by a user of the receiving device. The database of the receiving device may be a matrix comprising various entries that correlate identification numbers (such as a telephone number) of various communication devices with their associated information such as a first name of an owner of the telephone number, a second name of the owner of the telephone number, a nickname or a pet-name of the owner, a place of work of the owner, etc.

For example, when the first CLI is a telephone number of the transmitting device, the receiving device maps the received first CLI with the entries in the database. In case, the receiving device finds a match during the mapping, the receiving device may select any of the information, corresponding to the match found, as a second CLI of the transmitting device. In case, no match is found by the receiving device while mapping the first CLI with the said database, the receiving device may choose to select the first CLI as the second CLI of the transmitting device.

In another example, when the first CLI is information mapped by the network element, the receiving device skips the mapping of the first CLI with the database in the first CLI and chooses to select the first CLI as the second CLI.

After determining the second CLI of the transmitting device, the receiving device determines 630 whether the received SET-UP message comprises an indicator indicating a request for a customized CLI. In particular, the receiving device determines whether a user-user protocol discriminator field 930 (shown in FIG. 9) in the user-user information element 900 (shown in FIG. 9) of the SET-UP message includes an indicator such as particular combination of bits. In case the receiving device determines that a SET-UP message does not comprise any indicator indicating a request for a customized CLI, the receiving device may display 640 the second CLI of the transmitting device using conventional operations.

However, if the receiving device determines the presence of an indicator indicating a request for a customized CLI, the receiving device retrieves 650 a data message included in the SET-UP message received from the network element. In particular, the receiving device retrieves the data message from a user-user information field 940 (shown in FIG. 9) in a user-user information element 900 (shown in FIG. 9) of the SET-UP message. As previously explained, the data message may be a message sent by the user of the transmitting device that is to be displayed as the customized CLI.

After retrieving the data message from the received SET-UP message, the receiving device displays 660 the data message simultaneously with the second CLI corresponding to the first CLI, as a customized CLI, to alert a user of the receiving device of a new incoming call. In one example, after retrieving the data message, the receiving device announces the data message simultaneously with the second CLI corresponding to the first CLI, as a customized CLI announcement, to alert the user of the incoming call.

Figure 7:
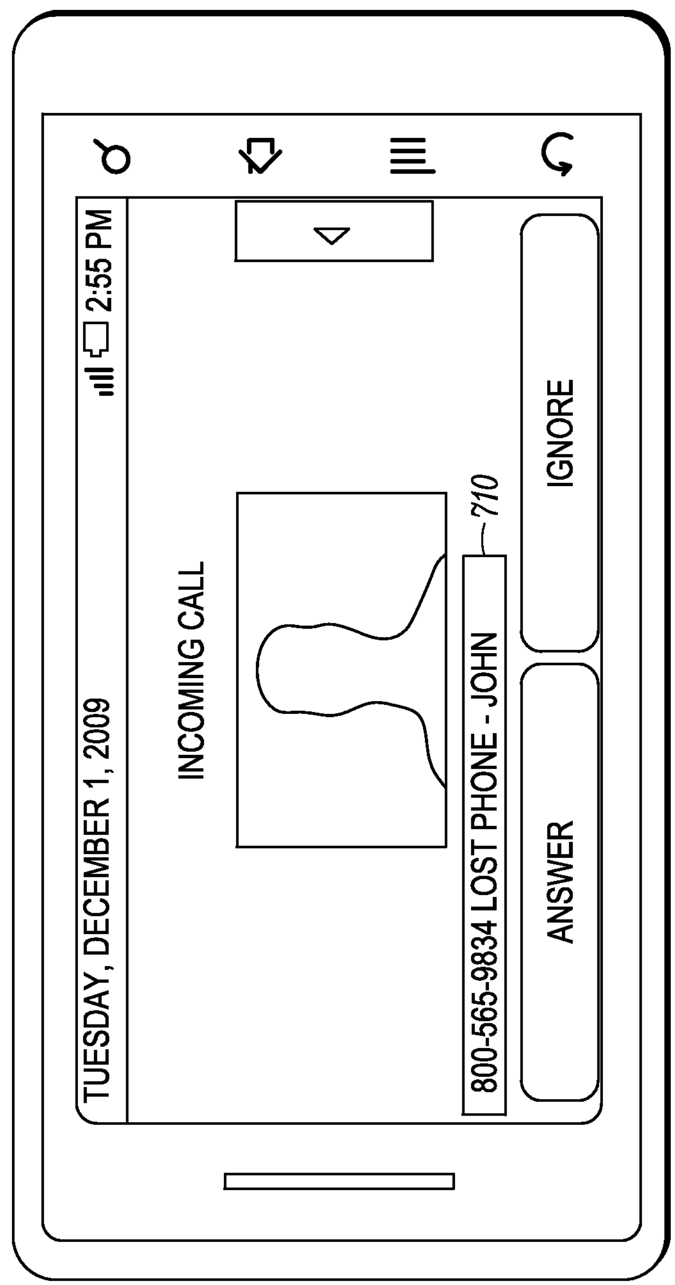
FIG. 7 is an exemplary view of a customized CLI as displayed on a communication device of a call recipient in accordance with some embodiments of the invention.
Figure 8:
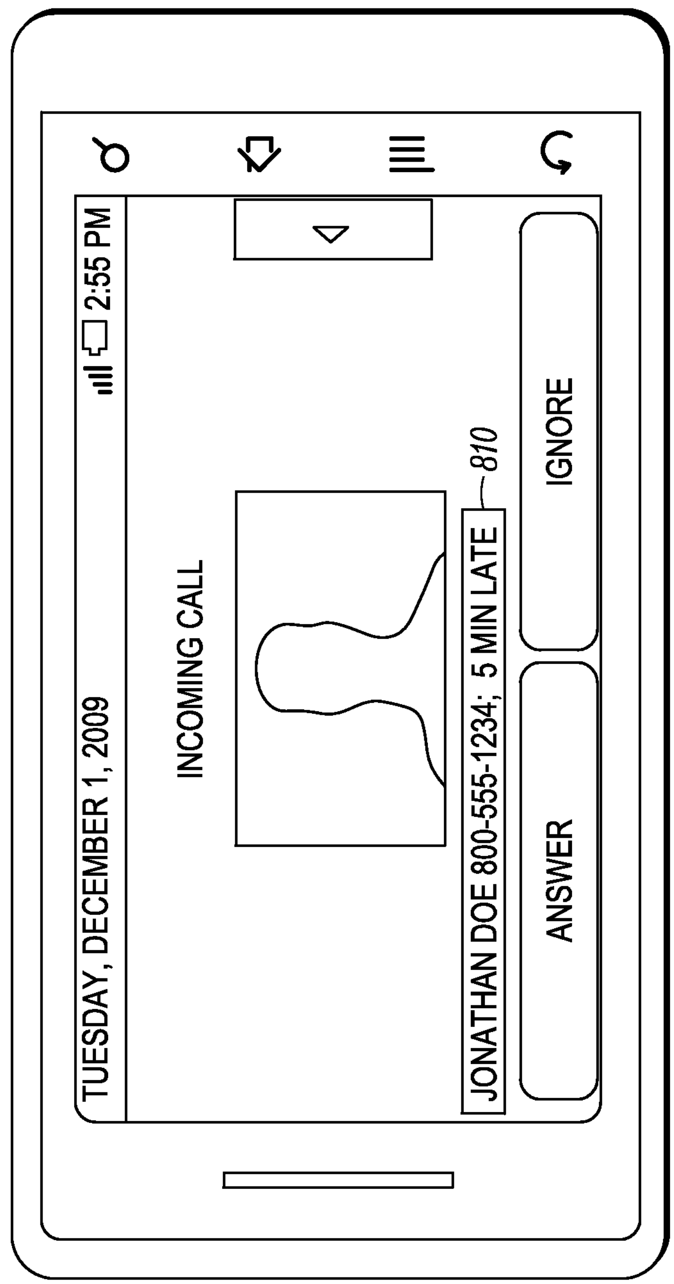
FIG. 8 is another exemplary view of a customized CLI as displayed on a communication device of a call recipient in accordance with some embodiments of the invention.

The invention is now described with respect to the example displays of customized CLIs as shown in FIGS. 7 and 8. FIG. 7 is an exemplary view of the customized CLI as displayed on a communication device of a call recipient. In this example, a company employee "John" has lost his own communication device while commuting to office one morning. In order to inform his wife "Sarah", John requests a colleague to allow him to make a call. John uses the colleague's phone to initiate a call set up request, along with a request for a customized CLI. The call set up request further comprises an identification of Sarah's telephone number. The data message for the customized CLI, as entered by John into the colleague's device, reads "Lost Phone—John."

As explained earlier, a network element receives this request for call set up which includes the identification of the colleague's device, i.e., the telephone number of the colleague's device in this example, the data message "Lost Phone—John", and a first indicator indicating a request for customized CLI. Further, the network element maps the received telephone number to a plurality of entries of a database in the network element. The database comprises an association of various telephone numbers and respective names of owners of these telephone numbers. The network element detects that the telephone number does not map to any entry in the database. So, the network element transmits a second set up request comprising the telephone number, the data message, and an indicator for customized CLI, as a set-up message, during the call set up, to Sarah's number.

Upon receiving the call, Sarah's communication device detects that the telephone number of the transmitting device does not map to any of its own stored records that associate names of people with their contact numbers. Sarah's communication device also detects the presence of the indicator for a customized CLI, and retrieves the data message. Therefore, while alerting Sarah of the incoming call, Sarah's device displays the telephone number of John's colleague, and the data message from John, simultaneously, on a display of the device, as a customized CLI, as shown on the display 710 in FIG. 7.

In another instance, John is running late for an important meeting and wants to inform his clients of the delay. For doing this, John initiates a call to his secretary "Mia" along with a request for a customized CLI. The data message sent by John for the customized CLI reads "5 min late."

Again the network element receives the request for call set up including the identification number of John's communication device, in this case, John's telephone number, the data message, and an indicator indicating a request for a customized CLI. The network element maps John's contact number to the database, and fails to find a match. The network element transmits a new set up message comprising John's number, data message, and an indicator indicating the request for customized CLI and transmits it to Mia's number which was extracted from the received request for call set up.

On receiving the set up message, Mia's communication device retrieves John's number from the set up message and considers the retrieved number as the first CLI. Mia's device now maps John's number to a phonebook database that relates various telephone numbers to their owners. Mia's communication device finds a match "Jonathan Doe" associated to John's number. And Mia's communication device associates "Jonathan Doe" as well as John's number as the second CLI. Mia's device also detects the presence of the indicator indicating the request for a customized CLI and accordingly retrieves the data message "5 min late" from the received set up message. Mia's device displays the second CLI, i.e., "Jonathan Doe 800-555-1234" and the data message, i.e., "5 min late" simultaneously on the display, while ringing the device, as a customized CLI, in order to alert Mia of the incoming call from John, as shown on the display 810 in FIG. 8.

In another example, Mia's device may select only "Jonathan Doe" as the second CLI and displays it simultaneously with the data message "i.e. 5 min late" as the customized CLI, to alert Mia of the incoming call.

The above invention may be of critical use in situations where the calling party wants to ensure that the receiving party receives the call immediately. In specific situations, when the calling party has insufficient battery charge available in the communication device to complete a call, the calling party may choose to send the information across by using the above disclosed customized CLI. The customized CLI also helps to ensure that the calling party is aware of a status-quo of the called party and therefore, acts accordingly. Further, it is helpful in scenarios where the calling party has insufficient credit balance available for completing a call, and wants to send a piece of urgent information across. In this case, the calling party may send the customized CLI, and the called party may choose to decline a call based on the customized CLI, thereby saving the called party any expenses, and still managing to receive the urgent message.

Even further, the invention may be of particular advantage to users whose communication devices are disabled for text messages or are not subscribed for such text messaging services. For such devices, the above invention provides a convenient method for receiving or sending any urgent information as a customized CLI. In another example, when a communication device associated with a called party is a set-top-box, the invention enables a calling party to send an urgent message as the customized CLI to the set-top-box. Further, the set-top-box may display the customized CLI on a television screen so that the called party (such as a family watching the television) is alerted. In yet another example, when a communication device associated with a called party is mounted in a vehicle, the invention enables a calling party to send an important piece of information as the customized CLI to the mounted communication device. In one example, the mounted communication device enables the customized CLI to be displayed on a display associated with the vehicle, to alert the end user such as a driver of the vehicle. In another example, the mounted communication device enables the customized CLI to be announced via a speaker system of the vehicle. In yet another example, the mounted communication device enables the customized CLI to be displayed on a display of the mounted communication device. Thus, the invention may be of crucial use to the end users. Even further, the use of the above described SET-UP message including the user-user information element ensures that the invention can be applied using the existing infrastructures of communication systems and does not require any physical modifications to the infrastructure. The invention may additionally benefit the network operators, who may charge minimally for the use of customized CLI. Overall, the invention provides a hitherto unexplored advantage to the calling party with regard to displaying its identification, as desired, to the called party.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing a customized Caller Line Identification (CLI), the method comprising:

receiving, by a network element, a first SET-UP message from a transmitting device during a call set up;

retrieving, by the network element, a data message and an identification of the transmitting device from the first SET-UP message when the first SET-UP message includes a first indicator, wherein the first indicator includes a combination of bits in a user-user information element of the first SET-UP message;

obtaining, by the network element, a first CLI of the transmitting device corresponding to the retrieved identification;

adding, by the network element, the data message, the first CLI, and a second indicator to a second SET-UP message, wherein the second indicator includes a combination of bits in a user-user information element of the second SET-UP message, wherein each of the user-user information element of the first SET-UP message and the user-user information element of the second SET-UP message includes a first octet, a second octet, a third octet, and a fourth octet, wherein the first octet includes a user-user information element identifier, the second octet includes a length of user-user contents, the third octet includes a user-user protocol discriminator, and the fourth octet includes user-user information;

transmitting, by the network element, the second SET-UP message to a receiving device during the call set up for displaying the customized CLI on a display of the receiving device, thereby alerting a user of the receiving device of an incoming call from the transmitting device.

2. The method of claim 1, wherein the first SET-UP message initiates a mobile originating call establishment and the second SET-UP message initiates a mobile terminated call establishment.

3. The method of claim 1, wherein the first indicator includes the combination of bits in the user-user protocol discriminator of the user-user information element of the first SET-UP message.

4. The method of claim 3, wherein the combination of bits in the first indicator is 00001100.

5. The method of claim 1, wherein the second indicator includes the combination of bits in the user-user protocol discriminator of the user-user information element of the second SET-UP message.

6. The method of claim 1, wherein the length of user-user contents indicates a number of octets corresponding to the user-user information, the user-user protocol discriminator indicates a coding used for the user-user information, and the user-user information comprises the data message.

7. A system for providing customized Caller Line Identification (CLI), the system comprising:

a network element, wherein the network element further comprises:

a first receiver, wherein the first receiver receives a first SET-UP message from a transmitting device during a call set up;

a first processor, coupled to the first receiver, wherein the first processor retrieves a data message and an identification of the transmitting device from the first SET-UP message when the first SET-UP message includes a first indicator, obtains a first CLI of the transmitting device corresponding to the retrieved identification, and forms a second SET-UP message comprising the data message, the first CLI, and a second indicator, wherein the first SET-UP message initiates a mobile originating call establishment and the second SET-UP message initiates a mobile terminated call establishment, wherein each of a user-user information element of the first SET-UP message and a user-user information element of the second SET-UP message includes a first octet, a second octet, a third octet, and a fourth octet, wherein the first octet includes a user-user information element identifier, the second octet includes a length of user-user contents, the third octet includes a user-user protocol discriminator, and the fourth octet includes a user-user information; and a first transmitter, coupled to the first processor, wherein the first transmitter transmits the second SET-UP message to a receiving device during the call set up for displaying the customized CLI.

8. The system of claim 7, wherein a length of the identification of the transmitting device is shorter than a length of the data message.

9. The system of claim 7, wherein the first indicator includes the combination of bits in the user-user protocol discriminator of the user-user information element of the first SET-UP message.

10. The system of claim 9, wherein the combination of bits in the first indicator is 00001100.

11. The system of claim 7, wherein the second indicator includes the combination of bits in the user-user protocol discriminator of the user-user information element of the second SET-UP message.

12. The system of claim 7, wherein the length of user-user contents indicates a number of octets corresponding to the user-user information.

13. The system of claim 7, wherein the user-user protocol discriminator indicates a coding used for the user-user information.

14. The system of claim 7, wherein the user-user information comprises the data message.

* * * * *